UNITED STATES PATENT OFFICE.

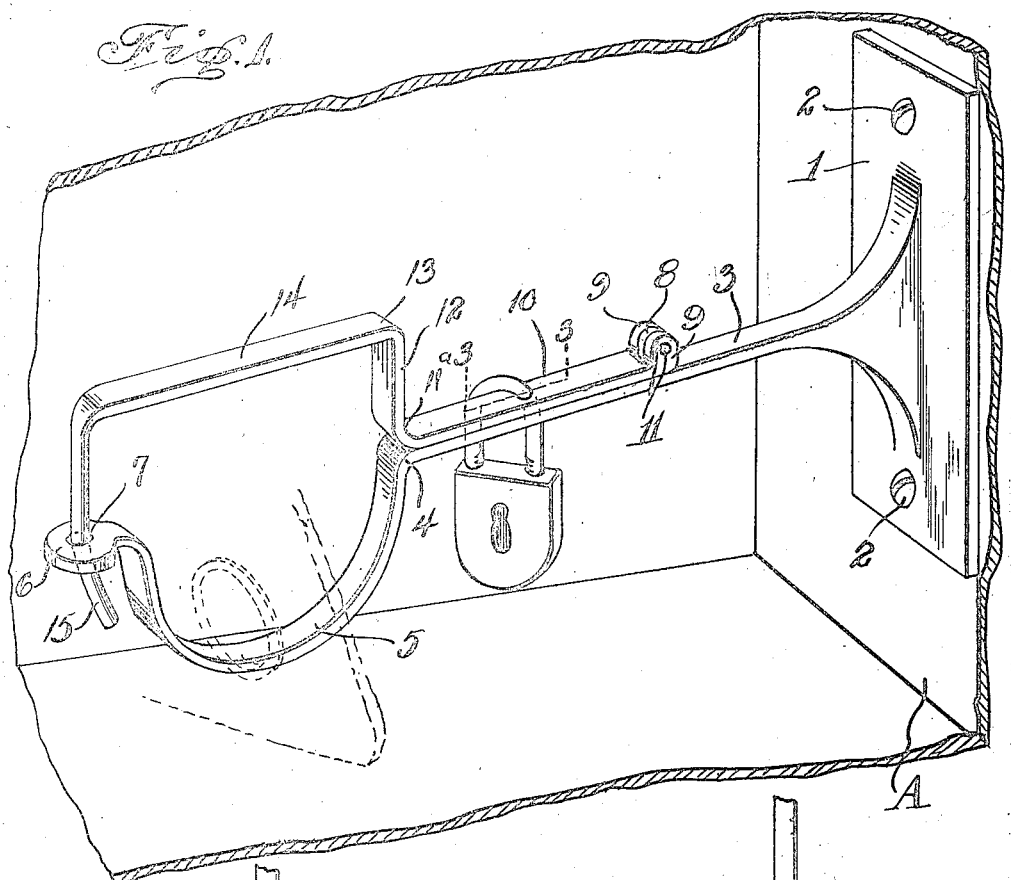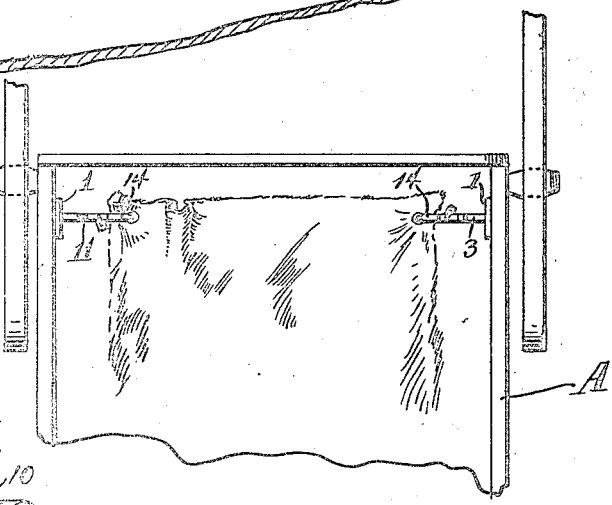

DANIEL PROWANT, OF CONTINENTAL, OHIO.

LAP-ROBE LOCK.

1,243,218.      Specification of Letters Patent.      Patented Oct. 16, 1917.

Application filed February 8, 1916. Serial No. 77,086.

*To all whom it may concern:*

Be it known that I, DANIEL PROWANT, a citizen of the United States, residing at Continental, in the county of Putnam and State of Ohio, have invented certain new and useful Improvements in Lap-Robe Locks, of which the following is a specification.

This invention relates to lap robe locks and more particularly to a lock for fastening the corners of a lap robe in the body of a vehicle so that the occupants of the vehicle will not be troubled with the edge of the blanket or lap robe gathering about the feet.

A further object of the invention is the provision of a lap robe lock which will securely fasten the corners of a lap robe and have key operating means for preventing the lap robe from being stolen or misplaced.

A further object of the invention is the provision of a lap robe lock which can be mounted in an inconspicuous place of the vehicle body and which will consist of comparatively few parts and is simple in construction, but durable and well adapted to withstand the rough usage to which devices of this character are ordinarily subjected.

For a full description of the invention and the advantages and merits thereof, reference is to be had to the following description and accompanying drawings, wherein is illustrated the preferred form of my invention, in which, Figure 1 is a perspective view of the device showing it attached to the body of a vehicle.

Fig. 2 is fragmentary top plan view of a vehicle body showing a lap robe fastened by the device.

Fig. 3 is a fragmentary sectional view on the line 3—3 of Fig. 1.

The supporting plate 1 is secured by screws 2 to the side of the body of the vehicle A. An integrally formed and laterally extending stationary arm 3 is provided on the supporting plate 1 and is bent downwardly at 4 to form a semi-circular loop 5 which terminates in a circular flange 6 through which an aperture 7 is formed. An upstanding ear 8 is provided on the stationary arm 1 and pivotally mounted thereon, are the ears 9 of the swinging arm 10. A pivot pin 11 is inserted through the apertures in the ears 8 and 9 so that the swinging arm 10 may be made to rotate when it is desired to insert the corners of the lap robe. The swinging arm 10 is bent at right angles as at 11ª to form the upstanding arm 12, which is also bent as at 13 to provide the longitudinally extending arm 14. A hook 15 is formed integrally with the arm 14 and extends at right angles therefrom, having its end slightly curved so that it may enter the aperture 7 when the swinging arm 10 is swung upon its pivot pin 11.

Slightly in advance of the ears 8 and 9, both of the arms 3 and 10 have apertures 16 which are in alinement when the arms are in contact with each other so that the shackle of a padlock may be inserted through the holes 16 for locking the arms 3 and 10 together. In order that the lap robe may not be torn or damaged by the device, a reinforced circular hole is provided in each corner of the blanket so that when the blanket is mounted upon the device, as shown in Fig. 2, it will not be damaged when a sudden tug or pull is given to the robe or blanket.

From the foregoing it will be observed that a very simple and durable lap robe lock has been provided, the details of which embody the preferred form. I desire it to be understood however, that slight changes or modifications in the minor details of construction may be made without departing from the spirit of the invention or the scope of the claims hereunto appended.

I claim:

1. A lap robe lock comprising a support having a stationary arm projecting at right angles therefrom, the said arm including a straight portion having a hinge element provided midway between its ends, its outer terminal being bent to form a loop of semi-circular formation, a circular flange formed on the extreme end of the loop and disposed in the same plane as the said supporting arm and provided with a central opening, a swinging arm pivotally connected to the said hinge element on the supporting arm, a yoke carried by the end of the swinging arm and adapted to register with the opening in the said flange, the said yoke comprising an arm disposed at right angles to the swinging arm, the said right angular arm having its end extended across the curved portion of the semi-circular bend in the supporting arm when the two are in operative position, a hook integrally formed with the end of the yoke and extended through the opening in the said flange, means for locking the said arms together including alined apertures formed in the arms and having the locking element extended therethrough whereby the hook and the said flange may be associated and held against accidental displacement.

2. A lap robe lock including a support mounted on the side of the vehicle body, an integrally and laterally extending stationary arm having an aperture at its free end, a swinging arm pivotally mounted upon said stationary arm and adapted to contact with said stationary arm, each of said arms provided with alining apertures, a hook formed on the end of the swinging arm and adapted to extend through the opening in the end of said stationary arm, and means mounted in the alining apertures in said arms for securing the arms together.

In testimony whereof I affix my signature in presence of two witnesses.

DANIEL PROWANT.

Witnesses:
C. E. HAM,
J. E. FENSLER.